Aug. 18, 1936.                R. A. NOLAN                2,051,056
                              RESCUE DEVICE
                          Filed April 20, 1934
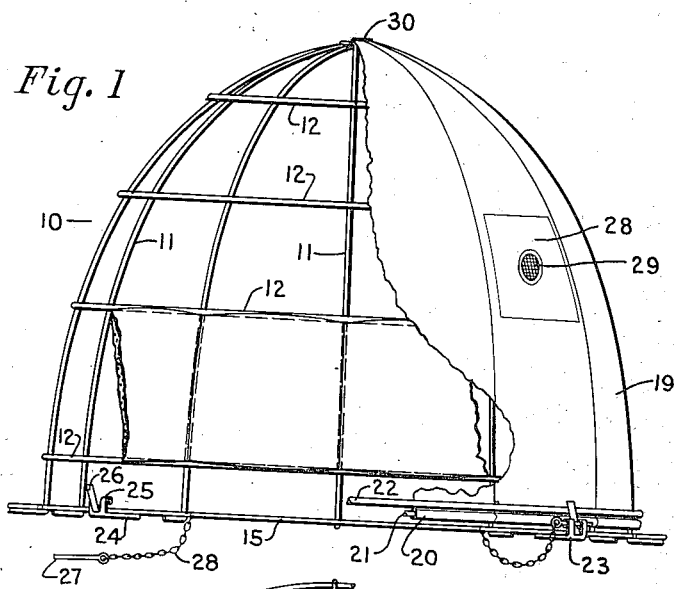
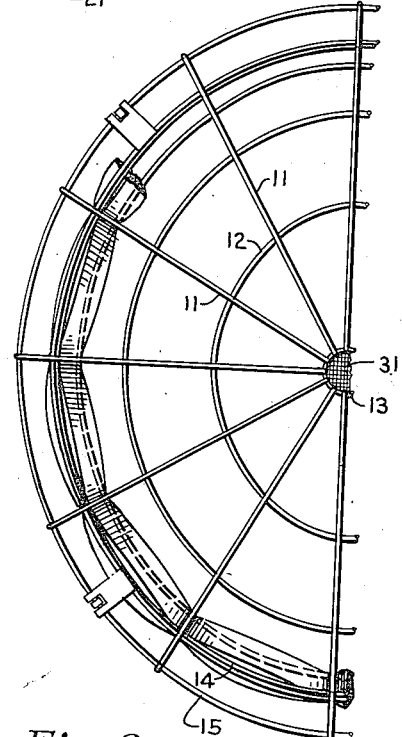
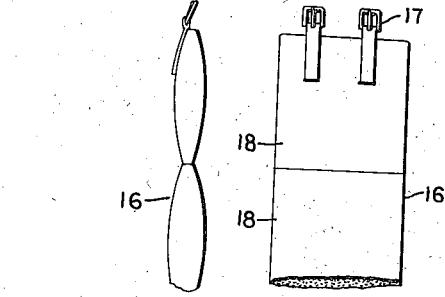
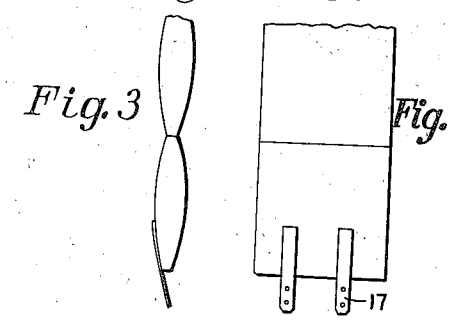
INVENTOR
ROGER A. NOLAN
BY
*Harold Dodd*
ATTORNEY Patented Aug. 18, 1936

2,051,056

UNITED STATES PATENT OFFICE 2,051,056

RESCUE DEVICE

Roger A. Nolan, United States Navy

Application April 20, 1934, Serial No. 721,502

3 Claims. (Cl. 9—14)

(Granted under the act of March 3, 1883, as amended April 30, 1928; 370 O. G. 757)

This invention relates to a rescue device and it has for an object the improvement of rescue facilities especially adapted for use in rescue work at oil fires, notably where there is burning oil floating on the water surrounding a ship or dock.

A further object of this invention is to provide a rescue hood intended especially to protect a swimmer who is forced to traverse burning oil floating on the water on his way to safety.

A further object of this invention is to provide a rescue hood which is especially intended for rescue work at oil fires on board a ship or at a dock and which is also serviceable for ordinary rescue work to assist one or more persons in making their way to safety while overboard.

A still further object of this invention is to provide a rescue hood which depends for its flotation on a life belt secured thereto, the life belt being easily separable from the device for independent use on a human figure.

In the drawing:

Fig. 1 is an elevational partly broken away view of this rescue device;

Fig. 2 is a partial bottom plan view of the device;

Figs. 3 and 4 are edge and side views of the life belt used in connection with this rescue device.

There is shown at 10 a bell-shaped wire cage in the shape of a hood or hemisphere made up of a plurality of longitudinal ribs 11 connected together by a plurality of preferably oval shaped rings 12 of increasing size substantially parallel to each other. The longitudinal ribs 11 extend between the top-most ring 13 and a pair of base rings 14 and 15, the base rings 14 and 15 being in the same plane with each other.

An elongated life belt 16 substantially rectangular in outline is provided for imparting flotation to this cage 10. This belt 16 has suitable fastening means 17 and 18 at each end thereof and is divided into a plurality of panels 18, the panels being stuffed with kapok or other suitable flotation material. As will be observed, each panel 18 is of such a width that it will just fit between the two lower oval shaped rings 12 and of such a length that it will just fit between two adjacent longitudinal ribs 11, as shown in Figs. 1 and 2. When the fastening means 17 is secured together with the life belt 16 as shown in Figs. 1 and 2 the panels 18 of the life belt will bulge under and the upper ring 12 and hold the belt securely in position on the cage 10.

As will be apparent, the belt 16 is suitable for use as a life belt as claimed and described in a copending application executed of even date herewith and filed concurrently herewith by the same inventor. With the belt 16 in position on the cage 10, the device is useful in the same manner as a life ring, that is, in the case of man overboard. The cage 10 with the belt 16 in position could be thrown overboard to the assistance of the victim.

The hood 19 is made of asbestos, flame-proof canvas, or suitable absorbent material or cloth so that it may become saturated with water, and is of such a shape as to just fit over the cage 10 and abut between the base rings 14 and 15. The lower edge of the hood 19 is provided with a hem 20 enclosing a rope or other flexible member 21 to thicken the same. A locking ring 22 is provided to fit over the hood 19, the ring 22 being of slightly larger diameter than the ring 14 but of substantially lesser diameter than the ring 15.

The ring 22 may, if desired, be permanently hinged to the base ring 15 at one place thereon. With the hood 19 in place, the locking ring 22 is passed thereover, wedging the hemmed edge against the ring 14, and the locking ring 22 is held in position thereon by suitable catch means 23. This catch means 23 may consist of a plate 24 fastened to the base rings 14 and 15 and terminating in bifurcated pintle receiving loops 25 between which is hinged a tongue 26. A pintle 27 is secured by chain 28 to the base ring 15; and in order to hold the hood 19 in position on the cage 10 the locking ring 22 is placed thereover and held by the tongue 26 pressed thereagainst by means of pintle 27 extending through loops 25.

The hood 19 is provided with a flame-proof eye piece 28, which includes a wire screening 29 and at its top is provided with an air opening 30 positioned to coincide with the opening through the top ring 13. The air opening 30 is provided with a flame-proof screening 31 so as to prevent entrance of the flame beneath the hood.

In operation, when completely assembled in this manner, the rescue device is especially intended for use for enabling a person to swim through flaming oil floating on water, and is intended to be kept on board ships or on docks wherever there is danger or possibility of oil fire as from fuel oil or the like. In case of emergencies, the hood may be grasped on the inside and held over the head while the person jumps overboard. The hood will then sink in the water to partly submerge the life belt enabling the person to swim under the protection of the hood through any surrounding flaming oil. In order to keep the temperature of the hood within reasonable limits the swimmer should splash water from under the hood so as to prevent the hood from catching on fire or getting too hot. As will be observed, the entire hood is somewhat oval shaped in outline, thereby making it easier to swim along the long axis, the eye piece 29 being preferably placed along this long axis so as to enable the swimmer to direct the hood more easily.

The invention described herein may be manufactured and used by or for the Government of the United States of America for governmental purposes without the payment of any royalties thereon.

I claim:

1. A rescue device comprising a cage, a life belt imparting flotation to said cage, and a hood covering said cage and life belt, said hood being of absorbent flame-proof material adapted to be wetted from the inside.

2. A rescue device comprising a cage, a life belt imparting flotation to said cage, and a hood covering said cage and life belt, said hood being of flame-proof material.

3. A rescue device comprising an open base cage, flotation imparting means secured about said cage adjacent said open base; a hood covering said cage, said hood being of absorbent material adapted to be made flame-resistant in use by being wetted on the inside by splashing the water in which the cage is floating through said open base.

ROGER A. NOLAN.